United States Patent
Jia

(10) Patent No.: US 9,257,788 B1
(45) Date of Patent: Feb. 9, 2016

(54) CONNECTOR RETENTION AND ALIGNMENT ASSEMBLY FOR USE IN COMPUTER AND DATA STORAGE MOUNTING RACKS

(71) Applicant: ORACLE INTERNATIONAL CORPORATION, Redwood City, CA (US)

(72) Inventor: Rui Jia, San Jose, CA (US)

(73) Assignee: ORACLE INTERNATIONAL CORPORATION, Redwood City, CA (US)

(*) Notice: Subject to any disclaimer, the term of this patent is extended or adjusted under 35 U.S.C. 154(b) by 0 days.

(21) Appl. No.: 14/603,751

(22) Filed: Jan. 23, 2015

(51) Int. Cl.
*H01R 13/629* (2006.01)
*H01R 25/00* (2006.01)

(52) U.S. Cl.
CPC ............ *H01R 13/629* (2013.01); *H01R 25/006* (2013.01)

(58) Field of Classification Search
CPC ............................ H01R 13/518; H01R 13/514
USPC ................................................. 439/715–718
See application file for complete search history.

(56) References Cited

U.S. PATENT DOCUMENTS

| | | | | | |
|---|---|---|---|---|---|
| 5,125,854 A | * | 6/1992 | Bassler | ................ | H01R 13/514 439/536 |
| 5,454,733 A | * | 10/1995 | Watanabe | ............ | H01R 13/514 439/540.1 |
| 5,480,322 A | * | 1/1996 | Ishii | .................. | H01R 13/6215 439/364 |
| 5,545,053 A | * | 8/1996 | Ishii | .................. | H01R 13/6215 439/364 |
| 5,567,182 A | * | 10/1996 | Ishii | ..................... | H01R 13/514 439/364 |
| 5,595,507 A | * | 1/1997 | Braun | ..................... | H01R 4/64 439/716 |
| 5,627,721 A | * | 5/1997 | Figueiredo | ........... | H01R 9/2441 361/111 |
| 5,643,014 A | * | 7/1997 | Filus | ................... | H01R 13/518 439/680 |
| 5,679,028 A | * | 10/1997 | Yagi | ..................... | H01R 13/518 439/701 |
| 5,800,187 A | * | 9/1998 | Vermon | ............... | H01R 31/085 439/716 |
| 5,829,910 A | * | 11/1998 | Kameyama | .......... | H01R 13/518 24/594.1 |
| 5,879,199 A | * | 3/1999 | Belopolsky | .......... | H01R 13/518 439/676 |
| 5,890,934 A | * | 4/1999 | Brooks | ................ | H01R 12/515 439/716 |
| 5,902,155 A | * | 5/1999 | Polgar | .................. | H01R 13/518 439/353 |
| 5,989,062 A | * | 11/1999 | Daoud | ................. | H01R 13/518 439/532 |

(Continued)

*Primary Examiner* — Ross Gushi
(74) *Attorney, Agent, or Firm* — Marsh Fischmann & Breyfogle LLP; Kent A. Lembke

(57) ABSTRACT

A cable connector assembly useful for properly aligning/positioning and retaining (during connecting and disconnecting) a number of connectors for computing devices. The assembly uses left and right side walls with flexible and resilient connector engagement members that provide at least some amount of outward "give" or movement to facilitate assembly but are designed to spring back into place after insertion of the connectors. The engagement members of the left and right side walls may each take the form of a leaf spring that can be flexed a distance outward but then spring back to or towards a non-deformed state to mate with and apply an inward retention force against the adjacent connector. The assembly includes removable and rotatable middle walls or dividers that are placed on posts extending upward from the inner surface of the assembly's base and allowed to rotate about the posts during the assembly process.

25 Claims, 13 Drawing Sheets

(56) References Cited

U.S. PATENT DOCUMENTS

| | | | | |
|---|---|---|---|---|
| 6,004,162 A * | 12/1999 | Harting | H01R 13/518 | 439/532 |
| 6,010,341 A * | 1/2000 | Matsuoka | H01R 13/518 | 439/364 |
| 6,017,250 A * | 1/2000 | Tsuji | H01R 13/518 | 439/701 |
| 6,093,041 A * | 7/2000 | Kay | H01R 9/2408 | 439/225 |
| 6,132,254 A * | 10/2000 | Wu | H01R 13/518 | 439/540.1 |
| 6,146,213 A * | 11/2000 | Yoon | H01R 9/2616 | 439/532 |
| 6,149,447 A * | 11/2000 | Maeda | B63B 22/04 | 439/157 |
| 6,171,153 B1 * | 1/2001 | Belopolsky | H01R 13/518 | 439/701 |
| 6,186,798 B1 * | 2/2001 | Follingstad | H01R 13/518 | 361/752 |
| 6,196,869 B1 * | 3/2001 | Kay | H01R 9/2441 | 439/532 |
| 6,203,379 B1 * | 3/2001 | Cai | H01R 13/514 | 439/676 |
| 6,227,894 B1 * | 5/2001 | Maeda | B63B 22/04 | 439/157 |
| 6,488,527 B2 * | 12/2002 | Yoon | H01R 9/2675 | 439/441 |
| 6,619,997 B1 * | 9/2003 | Wilson | H01R 9/2416 | 439/371 |
| 6,692,311 B1 * | 2/2004 | Kamei | H01R 9/2458 | 439/218 |
| 6,699,073 B1 * | 3/2004 | Wu | H01R 13/514 | 439/579 |
| 6,773,271 B2 * | 8/2004 | Falchetti | H01H 85/2045 | 439/701 |
| 6,840,820 B2 * | 1/2005 | Oda | H01R 13/518 | 439/721 |
| 6,846,200 B1 * | 1/2005 | Hsu | H01R 13/65802 | 439/540.1 |
| 6,926,553 B2 * | 8/2005 | Wu | H01R 9/0515 | 439/497 |
| 7,044,803 B2 * | 5/2006 | Baker | H01R 13/514 | 439/188 |
| 7,118,414 B2 * | 10/2006 | Spears | G06F 1/182 | 439/540.1 |
| 7,140,911 B1 * | 11/2006 | Rector | H01R 13/518 | 439/49 |
| 7,201,607 B2 * | 4/2007 | Bernhart | H01R 13/748 | 439/532 |
| 7,241,181 B2 * | 7/2007 | Machado | H01R 13/514 | 439/541.5 |
| 7,278,879 B2 * | 10/2007 | Kim | H01R 13/518 | 439/540.1 |
| 7,303,432 B1 * | 12/2007 | Chen | H01R 13/518 | 439/540.1 |
| 7,316,591 B2 * | 1/2008 | Ferderer | H01R 13/518 | 439/532 |
| 7,322,842 B2 * | 1/2008 | Duck | G02B 6/381 | 200/51.03 |
| 7,357,673 B2 * | 4/2008 | Long | H01R 12/716 | 439/607.05 |
| 7,367,851 B2 * | 5/2008 | Machado | H01R 13/514 | 439/620.06 |
| 7,374,447 B2 * | 5/2008 | Matsumoto | H01R 13/518 | 439/344 |
| 7,485,012 B2 * | 2/2009 | Daugherty | H01R 13/514 | 439/540.1 |
| 7,491,096 B1 * | 2/2009 | Correll | H01R 9/2408 | 439/716 |
| 7,503,802 B2 * | 3/2009 | Tu | H01R 25/003 | 439/540.1 |
| 7,553,199 B2 * | 6/2009 | Correll | H01R 9/2491 | 439/715 |
| 7,591,677 B2 * | 9/2009 | Bade | H01R 13/514 | 439/540.1 |
| 7,625,250 B2 * | 12/2009 | Blackwell | H05K 7/1425 | 439/717 |
| 7,641,514 B2 * | 1/2010 | Chen | H01R 13/518 | 439/540.1 |
| 7,722,402 B2 * | 5/2010 | Pepe | H01R 13/518 | 439/607.18 |
| 7,744,392 B2 * | 6/2010 | Khemakhem | H01R 24/46 | 439/188 |
| 7,744,414 B2 * | 6/2010 | Scherer | H01R 13/518 | 439/108 |
| 7,909,619 B2 * | 3/2011 | Pepe | H01R 13/514 | 439/541.5 |
| 8,157,584 B2 * | 4/2012 | Zhou | H01R 13/518 | 439/540.1 |
| 8,164,010 B2 * | 4/2012 | Zhou | H01R 13/518 | 200/51.02 |
| 8,167,638 B2 * | 5/2012 | Wojcik | H01R 13/506 | 439/352 |
| 8,206,185 B2 * | 6/2012 | Jehmlich | H01R 13/42 | 439/701 |
| 8,282,414 B2 * | 10/2012 | Zhou | H01R 13/518 | 439/541.5 |
| 8,292,660 B2 * | 10/2012 | Allwood | H01R 9/2416 | 439/540.1 |
| 8,433,171 B2 * | 4/2013 | Cooke | G02B 6/4453 | 385/135 |
| 8,444,439 B2 * | 5/2013 | Cao | H01R 13/514 | 439/108 |
| 8,449,337 B2 * | 5/2013 | Jehmlich | H01R 13/42 | 439/701 |
| 8,469,744 B2 * | 6/2013 | Nichols | H01R 13/518 | 439/607.01 |
| 8,512,067 B2 * | 8/2013 | Denter | H01R 4/2429 | 439/403 |
| 8,512,076 B2 * | 8/2013 | Zhang | H01R 13/6596 | 439/607.23 |
| 8,550,839 B2 * | 10/2013 | Fabian | H01R 13/506 | 439/460 |
| 8,579,661 B2 * | 11/2013 | Zhang | H01R 13/6587 | 439/540.1 |
| 8,602,807 B2 * | 12/2013 | Wojcik | H01R 13/506 | 439/352 |
| 8,678,855 B2 * | 3/2014 | Fasce | H04Q 1/06 | 439/532 |
| 8,684,772 B2 * | 4/2014 | Yu | H01R 13/514 | 439/717 |
| 8,992,266 B2 * | 3/2015 | Schmidt | H01R 13/506 | 439/701 |
| 9,039,460 B2 * | 5/2015 | Hackemack | H01R 9/16 | 439/716 |
| 9,069,149 B2 * | 6/2015 | Yu | G02B 6/3898 | |
| 9,071,001 B2 * | 6/2015 | Scherer | H01R 13/514 | |
| 2002/0182932 A1 * | 12/2002 | Petrie | H01R 13/514 | 439/540.1 |
| 2003/0194914 A1 * | 10/2003 | Duck | G02B 6/381 | 439/701 |
| 2004/0144737 A1 * | 7/2004 | Lindenbeck | H01R 13/518 | 211/26 |
| 2004/0209515 A1 * | 10/2004 | Caveney | H01R 13/518 | 439/540.1 |
| 2006/0223342 A1 * | 10/2006 | Borst | H01R 9/2608 | 439/55 |
| 2008/0009183 A1 * | 1/2008 | Wu | H01R 13/518 | 439/540.1 |

* cited by examiner

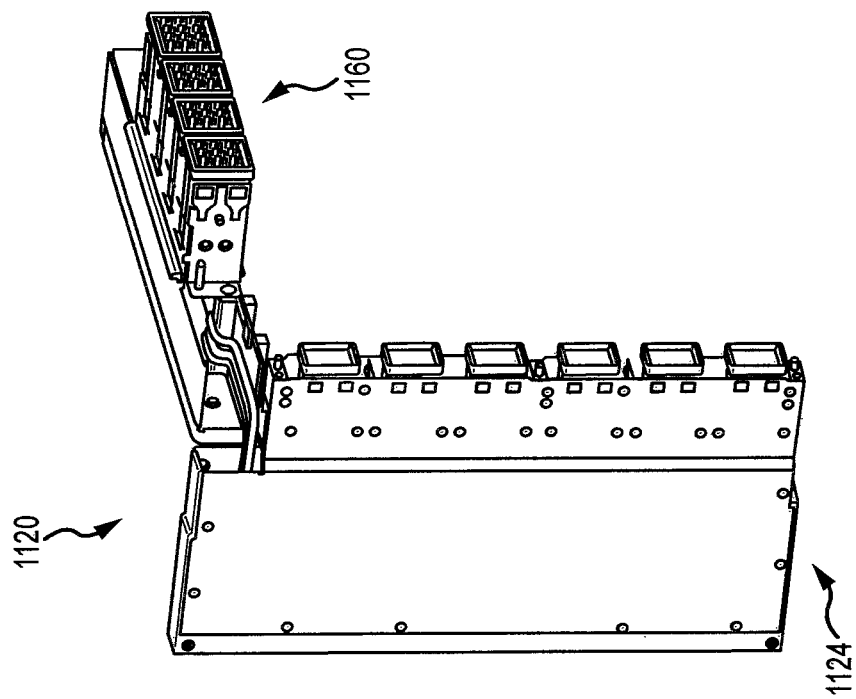
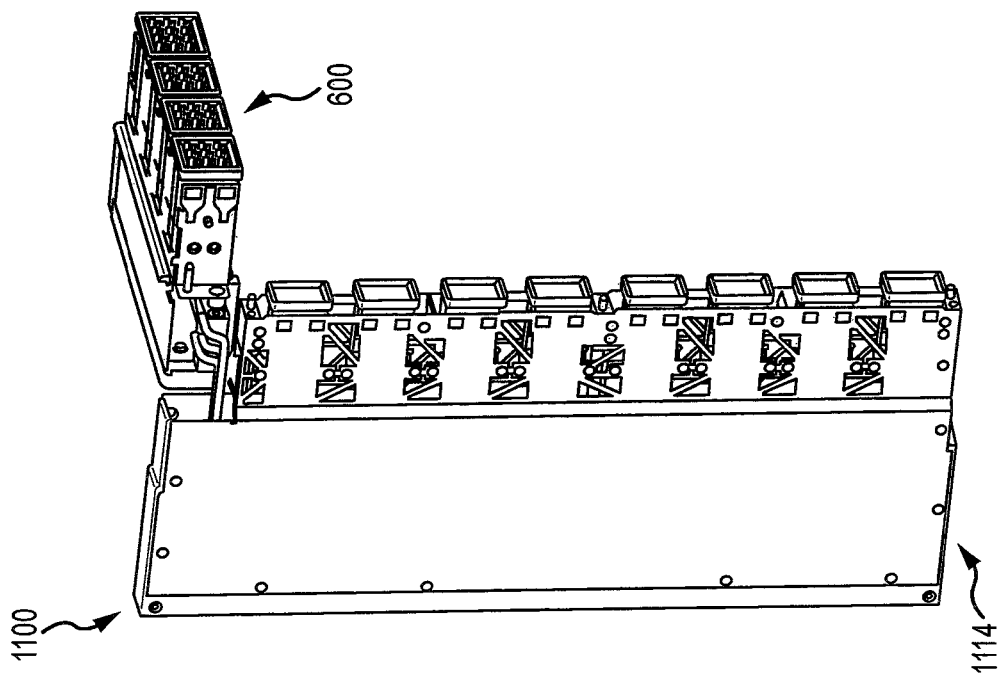
FIG. 11B
FIG. 11A

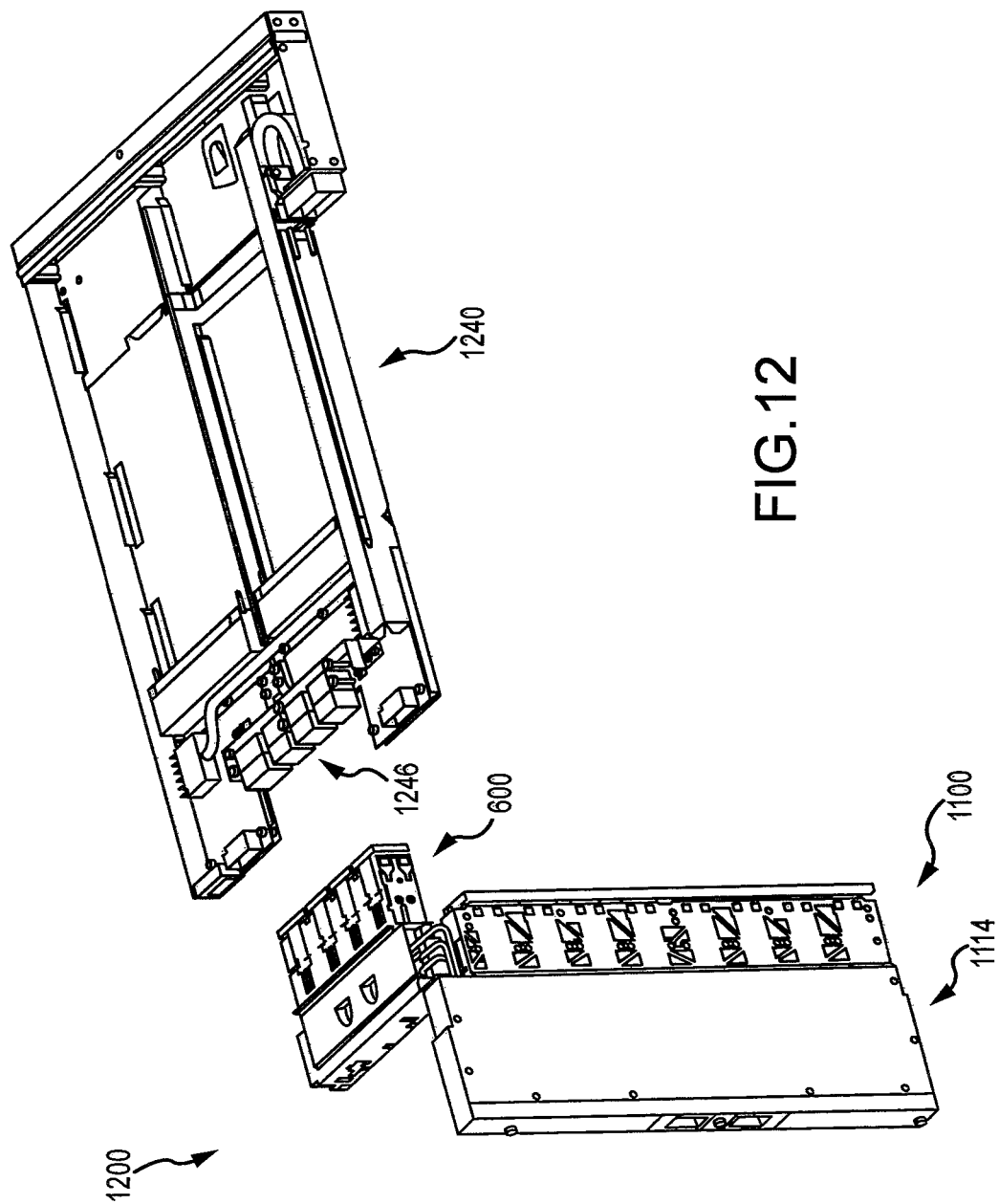

CONNECTOR RETENTION AND ALIGNMENT ASSEMBLY FOR USE IN COMPUTER AND DATA STORAGE MOUNTING RACKS

BACKGROUND

1. Field of the Description

The present description relates to connector assemblies for servers, data storage devices such as disk and tape drives, and other computing devices and, in particular, to a connector assembly designed to reduce manufacturing and assembly costs while providing proper alignment (or positioning) and retention of a set of connectors for a computing devices such as a server or service processor (SP) tray in a rack or other mounting structure for computing devices (e.g., data storage devices, servers, trays containing processors, and the like).

2. Relevant Background

In the data storage and computer industry, there are many implementations where it is desirable to mount devices, e.g., servers, drives, storage devices, and other computing devices, in close proximity. For example, many data rooms will include one-to-many racks, chasses, and other enclosures that are used to vertically stack numerous computing devices, which are arranged in horizontal slots or spaces. Within each slot or space, a computing device such as a service processor (SP) tray, a drive, a server, or the like may be inserted or slid into the rack or enclosure. Within each slot or space, a set of connectors typically are provided that allow the computing device to be inserted and to have its connection devices (e.g., male or female communication or power connectors) received and engaged for proper mating to deliver power to the computing device and to allow the computing device to digitally communicate within a system or network.

An ongoing challenge for enclosure and computing system designers is how best to provide the set of connectors within the racks or enclosures to facilitate ready insertion and removal of the computing devices from the slots or spaces. One example of a support structure or rack used in the computing industry is a truss, which may in turn be provided in an enclosure or a chassis, that is used to receive and support a number of SP trays (or the like). To facilitate power and communication connections, cable connector assemblies can be mounted onto the truss, and each of these cable connector assemblies in turn includes a connector alignment and retention assemblies to provide the desired connectors (e.g., customized connectors for the SP tray or other computing device to be received in the truss slot/space) in a known position and to retain these connectors in these positions while the computing device is inserted into the truss.

FIG. 1 illustrates an example of a connector alignment and retention assembly 100 that is presently used in the computing industry within a cable connector assembly (not shown in FIG. 1), and FIG. 2 shows an exploded view of the assembly 100. The assembly 100 is made up of a number of machined parts that have to be fit together and assembled in a predefined order. As shown, the assembly 100 includes a base or bottom plate 120 that supports a set of connectors in the form of three connectors 110 of a first type/configuration (e.g., a 4 by 16 connector) and one connector 114 of a second type/configuration (e.g., a 4 by 20 connector). FIG. 3 illustrates a front elevation view of the connectors 110, 114 as they may appear within the assembly 100 with gaps 119 between adjacent connectors 110, 114 with a predefined size or width, $W_{Gap}$. FIGS. 4A and 4B show left and right side perspective views of the connectors 110 showing tabs or raised elements 111, 113 used to retain the connectors 110, 114 within the assembly 100.

The assembly 100 further includes a cover or top plate 130, with the connectors 110 and 114 being sandwiched between the base 120 and the cover 130. The base 120 and cover 130 each have grooves 121 (seen in FIG. 2) and 132 for receiving a pusher/holder assemblies 140 that each couple at one end with one of the connectors 110, 114 to preload the connectors 110, 114 to apply a spring force that acts to bottom out or fully couple each connector 110, 114 with a corresponding connector of a mated or received computing device (e.g., an SP tray or module or other computing device adapted for use with connectors 110, 114).

The assembly 100 is adapted to align or position the connectors 110, 114 and also to retain their positions during connection with a computing device such as an SP tray or the like. To this end, the assembly 100 further includes a left side wall assembly 150, three middle walls 154, and a right wall assembly 158. Each of these is sandwiched between the base 120 and the cover 130, and each includes slots or openings 151, 155, 159 for receiving tabs or raised surface elements 111, 113, and 115 (with elements 113 and 115 shown in FIGS. 3 and 4B) provided on the sides of the connectors 110, 114, i.e., with two tabs provided on the left sides of the connectors 110, 114 and one tab on the right sides of the connectors 110, 114. The mating of these two features limits the amount of in and out (or forward and back) movement of the connectors 110, 114 during engagement with a computing device. The wall assemblies 150, 158 and the walls 154 provide a desired spacing between the connectors 110, 114 by maintaining the gaps 119, which may be relatively small in width, $W_{Gap}$, such as 0.4 to 0.6 mm or the like, as seen in FIG. 3, and the wall assemblies 150, 158 and walls 154. also prevent side-to-side movement of the connectors 110, 114 (e.g., retain the connectors in an aligned arrangement) in the assembly 100.

In some particular implementations, the spacing provided by the wall assemblies is 0.5 millimeters (mm), which only allows connectors 110, 114 to move side-to-side by 0.5 mm in the assembly 100. Similarly, forward and back allowable movement is controlled by the spacing between the tabs of the connectors and the slot edge of the wall assemblies. Top and down allowed movement is controlled by the gap between the connector and the cover and base. In some cases, it may make sense to define $W_{Gap}$ as the gap between the middle wall and the connector surface as it can useful in supporting proper functioning, rather than the gap between two connectors as this is often simply a clearance space maintained to be bigger than 2 times $W_{Gap}$ combined from each side.

Presently, the majority of the components of the assembly 100 are machined, rigid parts including the left wall assembly 150, the middle walls 154, and the side wall assembly 158 as well as the base 120 and the cover 130. The use of machined parts has increased the cost of fabricating the assembly 100, and the assembly 100 also is relatively expensive to assemble as the parts typically have to be put together onsite in a particular order. Stated differently, an existing problem in the computing industry is how to fit a number (e.g., four) of customized connectors into a tight space while restraining their movement well. The industry has, as shown in FIGS. 1-4B, attempted to address this problem by using a large number of separately machined parts that then have to be assembled together in a costly manner.

In this regard, a typical process for assembling the parts of the assembly 100 is shown in FIGS. 5A-5G. In a first step shown in FIG. 5A, the left wall assembly 150 is affixed to the left edge of the base 120. In a second step shown in FIG. 5B, the first connector 110 is placed on the base 120 and against the left wall assembly 150, and, then, a first one of the middle walls 154 is attached to the base 120 so as to hold the connector 110 in place. In a third step shown in FIG. 5C, a next or second connector 110 is placed on the base 120 so as to abut the previously placed middle wall 154. Then, in the step shown in FIG. 5D, an additional middle wall 154 is attached to the base 120 so as to retain the second one of the connectors 110, and, then, a third or next connector 110 is placed on the base 120 so as to abut the previously attached middle wall 154.

In the step shown in FIG. 5E, the last of the middle walls 154 is attached to the base 120 to retain the third connector 110 in place, and, then, the fourth or last connector 114 is placed on the base 120 in contact with the middle wall 154. To fully retain the connector 114 from side-to-side movement the right wall assembly 158 is attached to the base 120 so as to abut the connector 114. Next, in the step of FIG. 5F, the cover 130 is placed over the connectors 110, 114 and affixed (e.g., screwed) to the wall assemblies 150, 158 and middle walls 154. Finally, in the step of FIG. 5G, the pusher/holder assemblies 140 are mounted to the cover 130 so as to engage and preload the connectors 110, 114 within the assembly 100. As will be appreciated, the assembly process has to be followed in this exact order to have the rigid, machined parts fit together properly. This manual assembly process can be relatively time consuming and exacting such that the combination of use of machined parts and relatively difficult fabrication process results in increased costs for the producing the assembly 100.

Hence, there remains a need for improved designs for a connector alignment and retention assembly for use with racks and enclosures used to support computing devices. Preferably, the new designs would reduce manufacturing and/or material costs of the components used within the assembly. Additionally, it is desirable for the new design to support a less complex and/or less time consuming method of assembling the components of the assembly. The new design described herein integrates the assembly of the pusher/holder assemblies into the base or cover assembly, which now can be done right at a sheet metal manufacturer site. This is significantly less expensive and less time consuming than having a sheet metal manufacturer providing metal parts including pushers/holders to cable/connector vendors who put the assembly together.

SUMMARY

In a typical computer connector assembly, a number of connectors (e.g., 2 to 4 or more custom connectors) need to be assembled together in a particular predefined configuration or alignment with gaps or spacings between the adjacent connectors retained. The inventor recognized that it would be beneficial with regard to cost and ease of assembly if all or at least a portion of the components of the connector assembly could be manufactured using sheet metal or upon a sheet metal tray rather than all or most of the components being machined and rigid parts that have to be assembled in a particular order to properly fit together. One difficulty though is that the connectors have to be provided in a limited space, and the sheet metal tray opening is only a small amount (e.g., a few millimeters) wider than the combined width of the connectors. Further, these connectors are installed only in forward/backward direction since the pusher/holder assemblies are pre-installed, which is why the middle walls of the new design are provided so as to be rotatable so as to clear the path (as discussed in detail below).

With these issues in mind, a connector retention and alignment assembly is described that is useful for properly aligning/positioning and retaining (during connecting and disconnecting) a number (e.g., 2 to 4 or more) of connectors for computing devices. The assembly uses flexible left and right side walls (or, at least, sidewalls with flexible and resilient connector engagement members) that provide at least some amount of outward "give" or movement (e.g., up to 4 mm or more) to facilitate assembly but are designed to spring back into place after insertion of the connectors. For example, the engagement members of the left and right side walls may each take the form of a leaf spring or another resilient element that can be flexed a distance outward but then spring back to (or at least toward) its non-deformed state to mate with and apply an inward retention force (e.g., a spring force) against mating sides of the adjacent connector in the assembly.

To further facilitate assembly and manufacture, the assembly includes removable and rotatable parts as the middle walls or dividers. For example, the middle walls may be placed on posts extending upward from the inner surface of the assembly's base and allowed to rotate about the posts during the assembly process, e.g., rotate one direction (clockwise or counterclockwise) to allow a connector to be placed on the base and then rotate a second direction (counterclockwise or clockwise) to move into an abutting relationship with the exposed side of the connector. In this manner, all the connectors can be readily assembled in a sequence yet still be properly restrained in aligned and spaced apart positions (e.g., as well as if there were solid outer sidewalls and non-rotatable inner or middle walls). The flexible and removable components of the assembly may each be fabricated using sheet metal, which only costs a fraction of similar machined parts (i.e., sheet metal parts may only cost 10 to 20 percent of the same machined parts), thereby both the cost of parts and the cost of assembly can be reduced with the new connector retention and alignment assembly More particularly, a connector engagement and retention assembly (or cable connector assembly is provided that is facilitates manufacture and later assembly of its components. The assembly includes a base plate and a left side wall extending vertically upward from an upper surface of the base plate. The assembly also includes a right side wall extending vertically upward from the upper surface of the base plate, with a space is defined between inner surfaces of the left and right side walls. Further, the assembly includes a set of two or more connectors positioned side-by-side within the space between the left and right side walls. To facilitate assembly and retention, a first connector engagement member is provided that extends from an end of the left side wall. The first connector engagement member includes a resilient body that abuts a proximate side of a leftmost one of the connectors to apply a retention force. The assembly also includes a second connector engagement member extending from an end of the right side wall, and the second connector engagement member has a resilient body that abuts a proximate side of a rightmost one of the connectors to apply a retention force.

In some embodiments, the resilient body of each of the first and second connector engagement members is configured to be or act as a leaf spring such as by fabricating the body as a unitary piece of a stainless steel with a thickness in the range of 0.1 to 1.0 millimeters (mm). The resilient body of each of the first and second connector engagement members may be mounted to the side wall so as to have a cantilevered portion contacting a corresponding one of the proximate surfaces, and the cantilevered portion has a length in the range of 15 to 30 mm. Further, at least one opening/window may be provided in the cantilevered portion with a width greater than a width of a tab on the proximate surface of the leftmost or rightmost connector by at least 1 mm (whereby the connector is retained but is provide some amount of in and out movement within the assembly).

In some implementations, the assembly further includes a set of spaced-apart mounting posts extending vertically upward from the upper surface of the base plate and a set of middle walls each pivotally coupled with one of the mount posts. Each of the middle walls is rotatable from a connector placement position to a connector engagement position (e.g., through a rotation range of 0 to 15 degrees or more) so as to contact a side of one of the previously installed connectors (e.g., placed on the base plate with the middle wall rotated out of the way). The middle walls, once all the connectors are installed, are each sandwiched between adjacent pairs of the connectors and act to retain a gap between each of the adjacent pairs of less than about 1 mm such as less than about 0.6 mm.

BRIEF DESCRIPTION OF THE DRAWINGS

FIGS. 11A and 11B illustrates use of the connector retention and alignment assembly of the present description within a computing device mounting assembly (e.g., use with an SP truss); and FIG. 12 illustrates with a partially exploded view a computer assembly that includes the assembly of FIG. 11A along with a SP tray.

DETAILED DESCRIPTION

Briefly, the following describes an assembly that can be used for providing a connection of a computing device, such as a service processor (SP) tray, a server, a tape or disk drive, or the like, to communication and/or power cables within a rack or mounting enclosure (e.g., within a truss, a chassis, or the like). The assembly may be referred to interchangeably as a cable connection assembly, a connector retention and alignment assembly, an assembly, or the like in this description.

The assembly utilizes connector engagement members in the right and left sidewalls that are flexible and, more importantly, resilient so that they can be flexed or moved outward away from the interior space of the assembly to receive the outer connectors and then flex or spring back to their original position or non-deformed shape. This acts to facilitate assembly and also then provides an inward directed retention force on the sides of the connectors. The assembly further includes removable and rotatable middle walls (or dividers) to provide connector retention and to also facilitate assembly as the walls can be rotated about a mounting post extending up from a base wall or plate to ease initial placement of a connector (and then the rotatable wall can be rotated into its retention position where it abuts the connector's sides or tabs extending therefrom).

Figure 1:
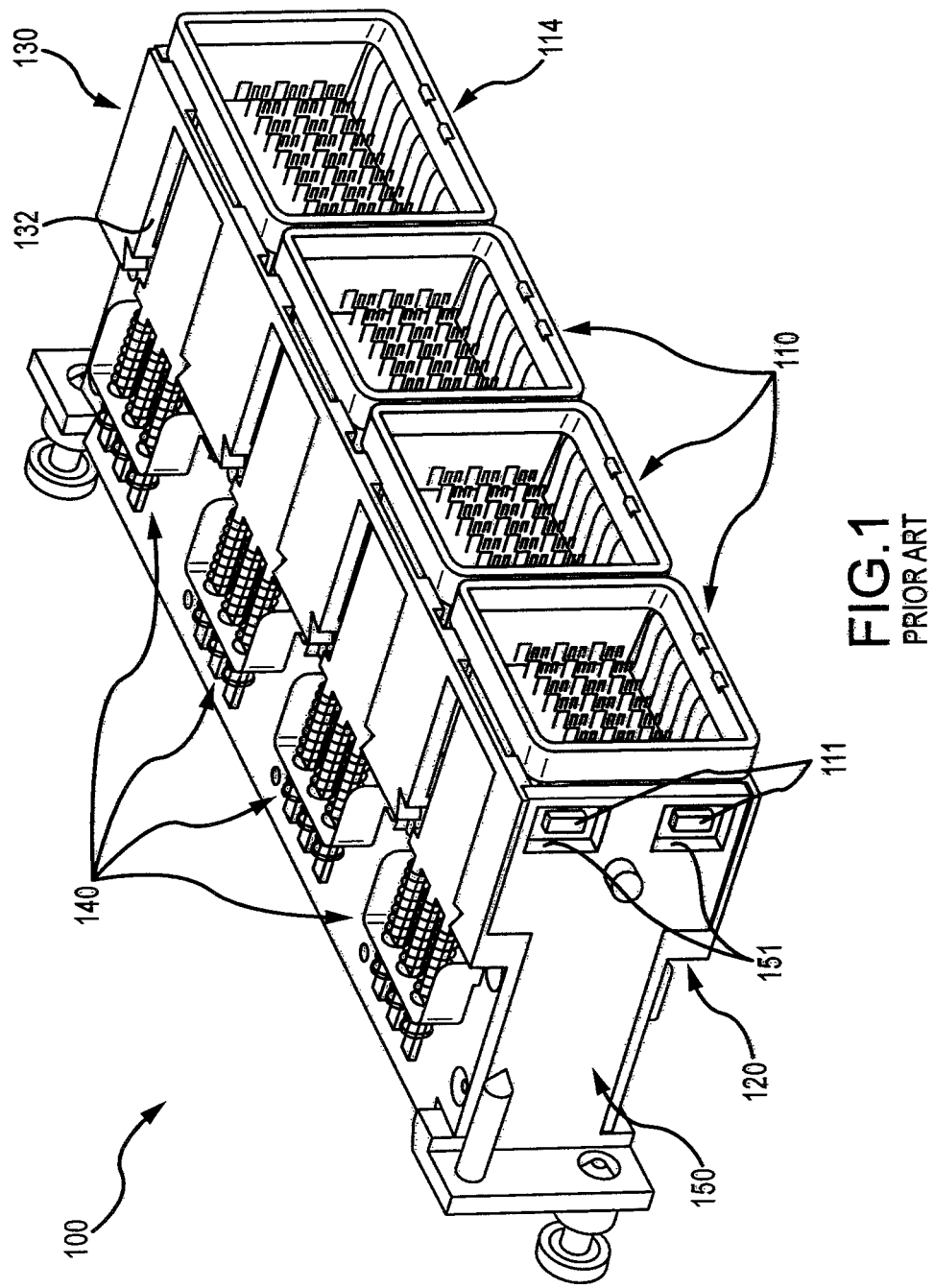
FIG. 1 is a top perspective view of a conventional connector assembly made up of numerous individually machined components.
Figure 2:
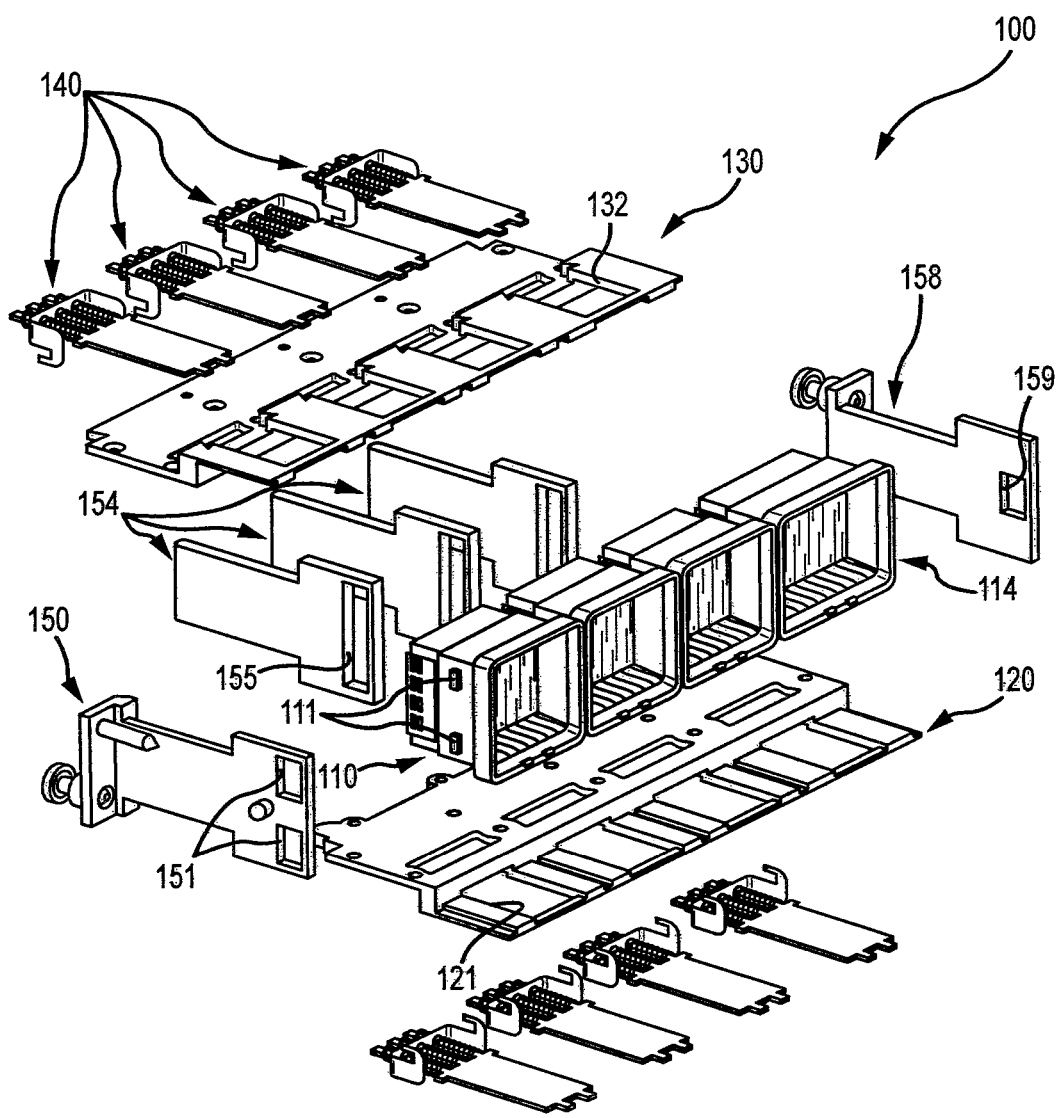
FIG. 2 illustrates an exploded view of the connector assembly of FIG. 1.
Figure 6:
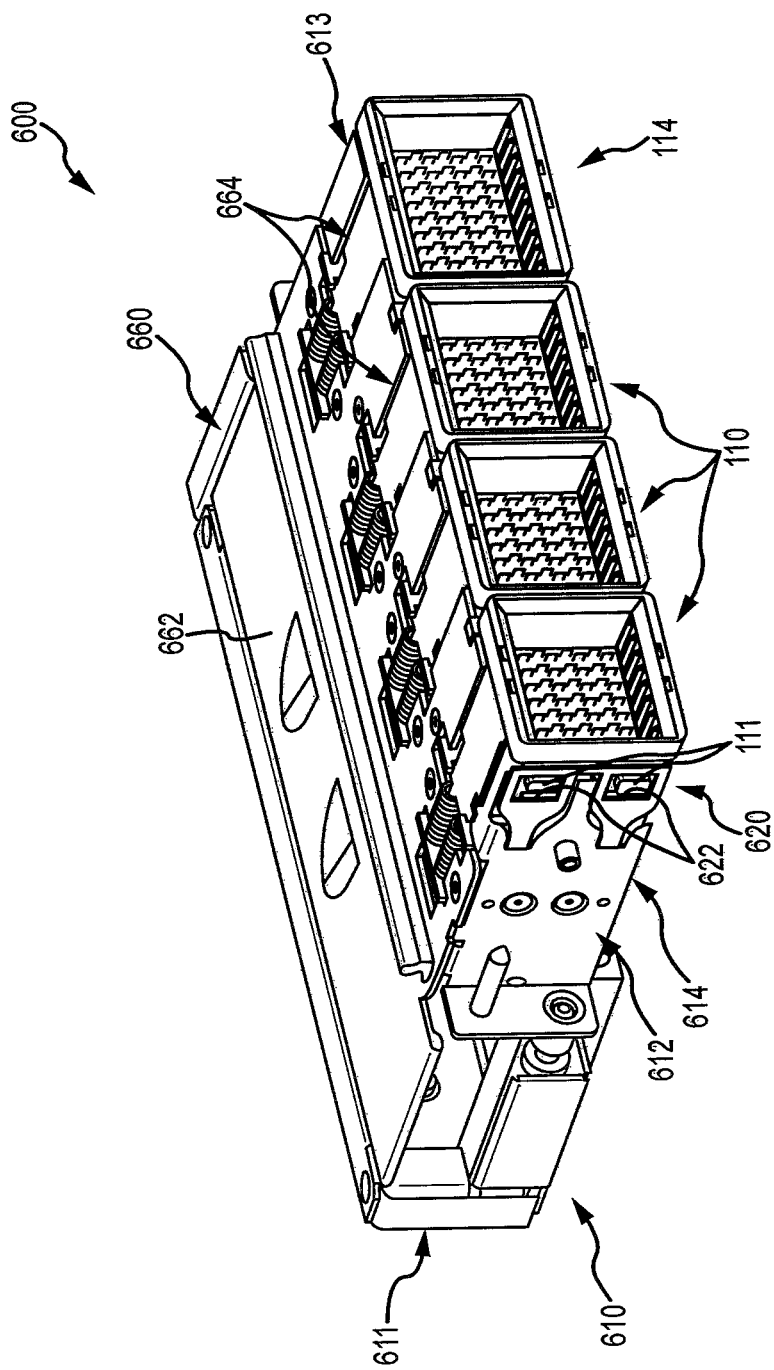
FIG. 6 illustrates a perspective view, similar to that of FIG. 1, of a connector retention and alignment assembly according to the present description.

FIG. 6 illustrates a front, upper perspective view (similar to that of FIG. 1) of a connector retention and alignment assembly 600 of the present description. The assembly 600 is used to provide a set or number of connectors 110, 114 (i.e., the same communications/power connectors, in this non-limiting example, as those provided in the machined part-based assembly 100 of FIG. 1) for connection to a computing device in a mounting rack or enclosure (e.g., a chassis).

For example, FIG. 11A shows a computing device mounting assembly 1100 in which the assembly 600 of FIG. 6 is mounted within a service processor (SP) truss (e.g., a CMIOU SP truss), which may in turn be provided within another enclosure or chassis. FIG. 12 shows a computer assembly 1200 in a partially exploded view that includes the mounting assembly 1100 and an SP tray 1240 with a set of connectors 1246 as the tray 1240 is being coupled with the connectors of the connector retention and alignment assembly 600 (e.g., as the tray 1240 is slid into a slot or space of mounting rack or enclosure including the SP truss 1114). FIG. 11B shows another computing device mounting assembly 1120 that includes another exemplary SP truss (e.g., a Switch SP truss) 1124 upon which another embodiment of connector retention and alignment assembly 1160. In this assembly 1160, the base assembly (explained below) differs from that of the assembly 1100 to allow mating and coupling with the SP truss 1124, but, otherwise, the assembly 1160 matches the configuration of the assembly 600 including its use of resilient members in its sidewalls and rotatable middle walls/dividers.

Figure 3:
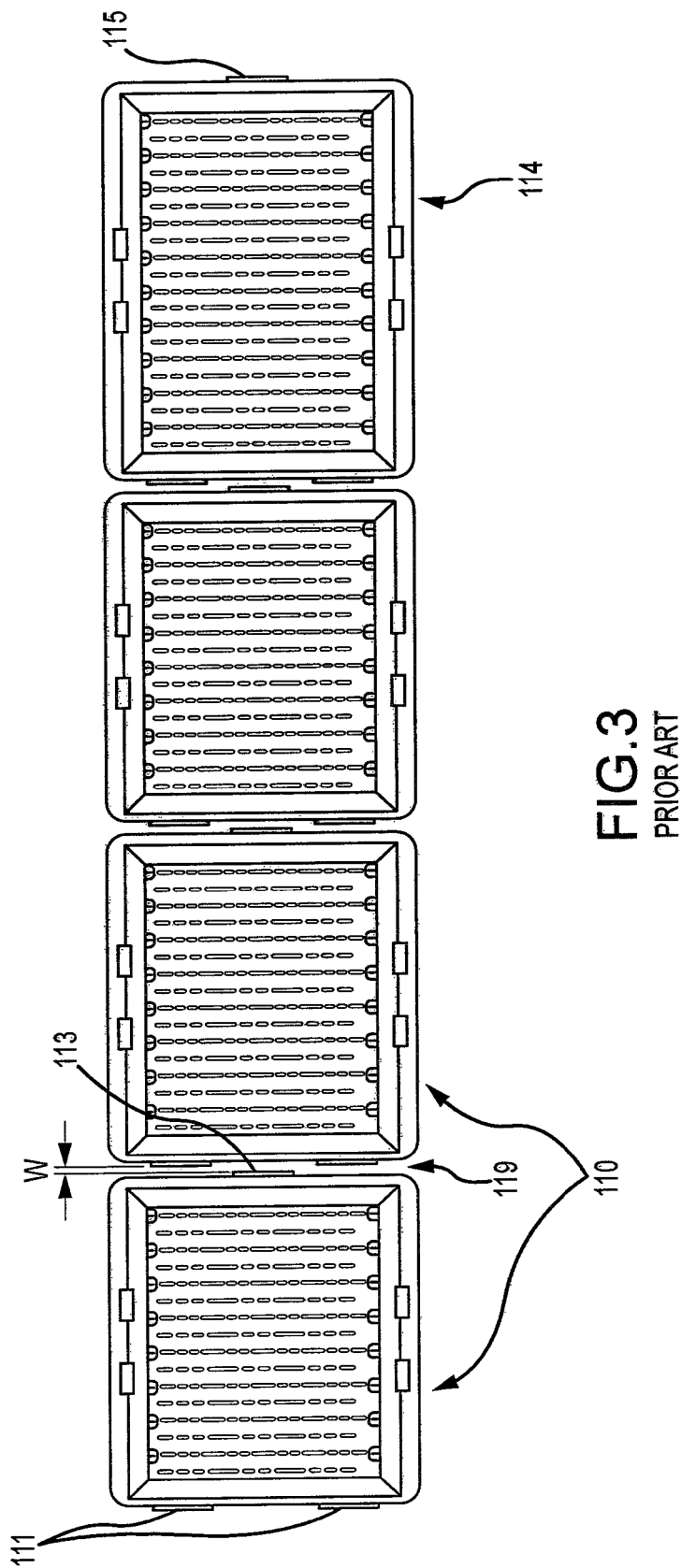
FIG. 3 is a front elevation view of the set of connectors of the assembly of FIGS. 1 and 2 showing the gap retained between the connectors and the side tabs received by retaining walls (side and middle walls)
Figure 4A:
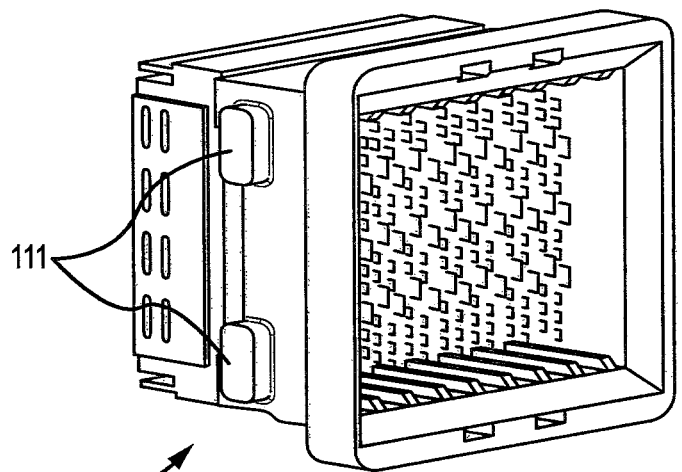
FIGS. 4A and 4B are left and right side perspective views of one of the connectors of FIG. 3.
Figure 4B:
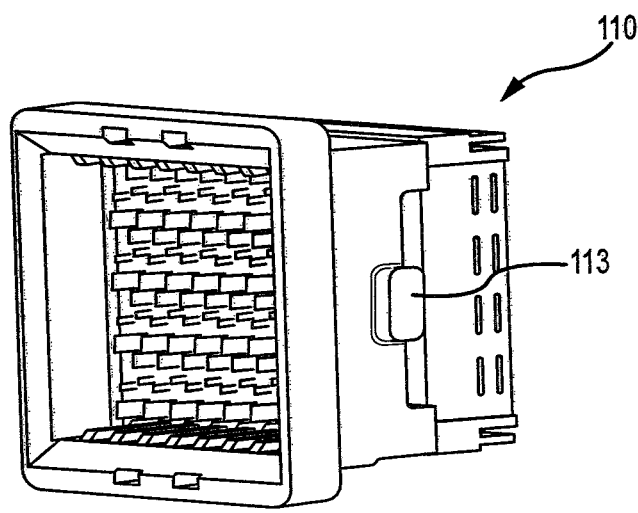
Figure 5A:
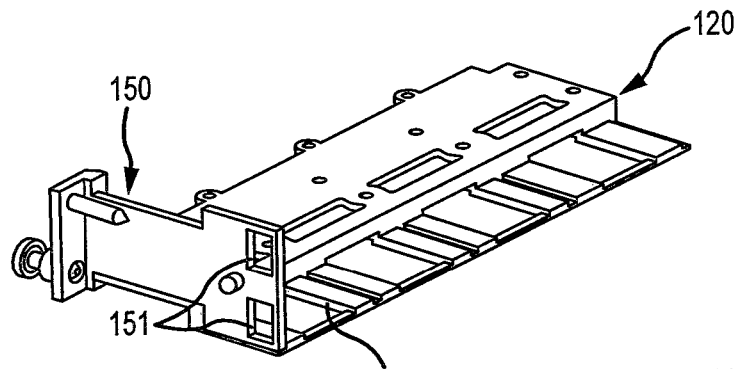
FIGS. 5A-5G illustrate steps of an assembly method for the conventional connector assembly of FIGS. 1 and 2.
Figure 5B:
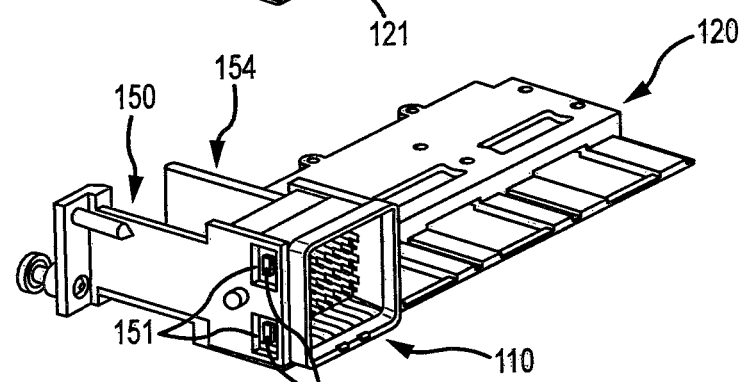
Figure 5C:
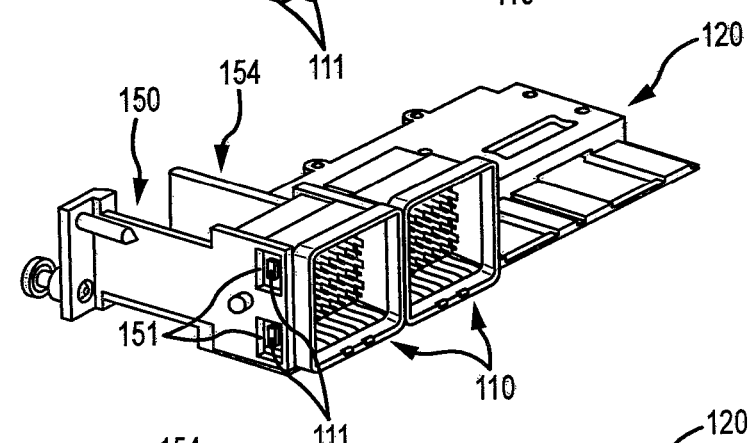
Figure 5D:
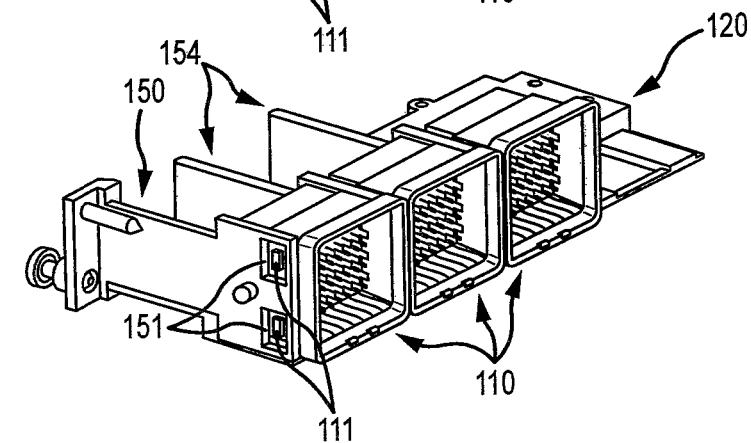
Figure 5E:
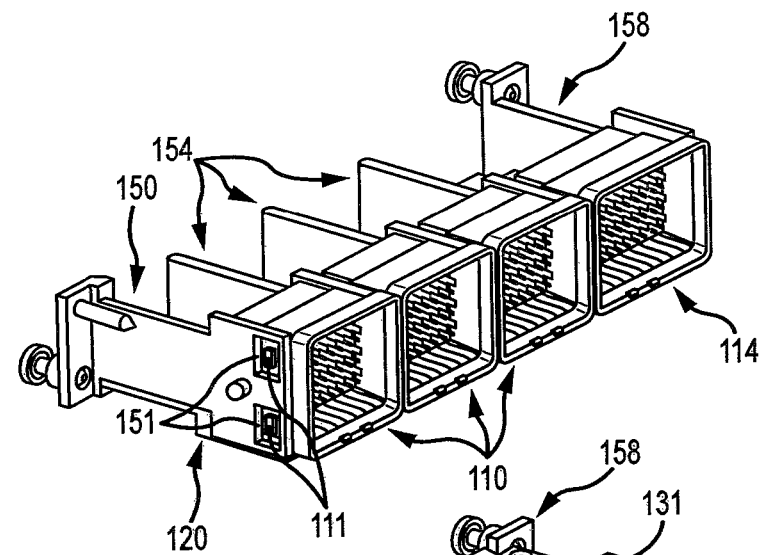
Figure 5F:
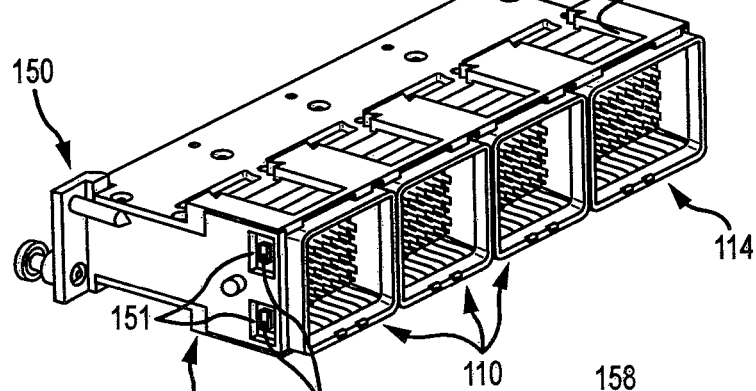
Figure 5G:
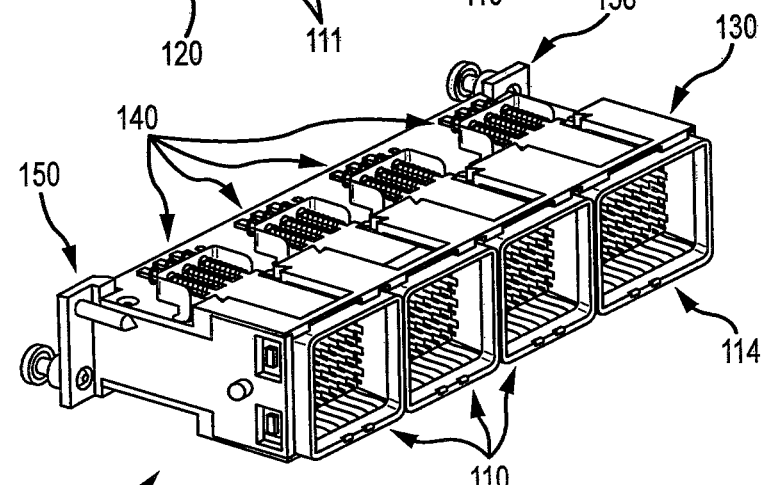

As shown in FIG. 6, the assembly 600 includes four device connectors 110, 114. The assembly 600 further includes a base assembly 610 with a back wall 611 and a pair of vertical, outer sidewalls 612, 613 (e.g., right and left side walls) that extend upward from a base or base plate 614. The connectors 110, 114 are supported, in part, by the base plate 614 and positioned between the side walls 612, 614 or in the interior space of the assembly 600 as defined between the two side walls 612, 614. As discussed with reference to FIG. 3, a small space or gap (e.g., 0.3 to 7 mm or the like with one embodiment providing a gap of about 0.5 mm between adjacent connectors 110, 114) is provided between the adjacent pairs of the connectors 110, 114, and the right and left sidewalls 612, 613 along with the base plate 614 act to define vertical and horizontal positioning or alignment of the connectors 112, 114 within the assembly 600.

The assembly 600, to enable assembling of the components, includes a right connector engagement member 620 that extends outward from the end of the right side wall 612 so as to be positioned adjacent to a side of one of the connectors 110. The member 620 includes two windows/openings 622 to receive a pair of tabs or raised elements 111 on the adjacent or proximate side of the connector 110 (the rightmost connector in the set of connectors 110, 114). The windows/openings 622 are sized and shaped to allow the tabs 111 to extend into and, in some cases, through the windows 622, and the width or depth of these windows 622 typically is larger than the tab width so as to allow some in and out (or forward and back) movement of the connectors 110, 114 within the assembly 600 during coupling with connectors of a computing device (e.g., with an SP tray). More significantly, as discussed more below with reference to FIG. 7, the member 620 is fabricated so as to be flexible and resilient such that it can be pushed outward (at least a small distance) from the interior space as the connector 110 is positioned on base plate 614 and then to spring back into place to apply an inward directed retaining force. In some embodiments, the member 620 is a leaf spring fabricated from aluminum or another metal or from plastic.

The assembly 600 further includes a cover assembly 660 to enclose the assembly 600. The cover assembly 660 includes a cover or top plate 622 that is affixed to the base assembly 600 and extends from the back wall 611 to the front edge of the base plate 614. Further, the cover assembly 660 includes a set of pusher/holder assemblies 664 (i.e., one for each connector in the assembly 600) that engage the upper edges of the connectors 110, 114 to preload the connectors to ensure full engagement with a later received set of connectors of a computing device.

Figure 7:
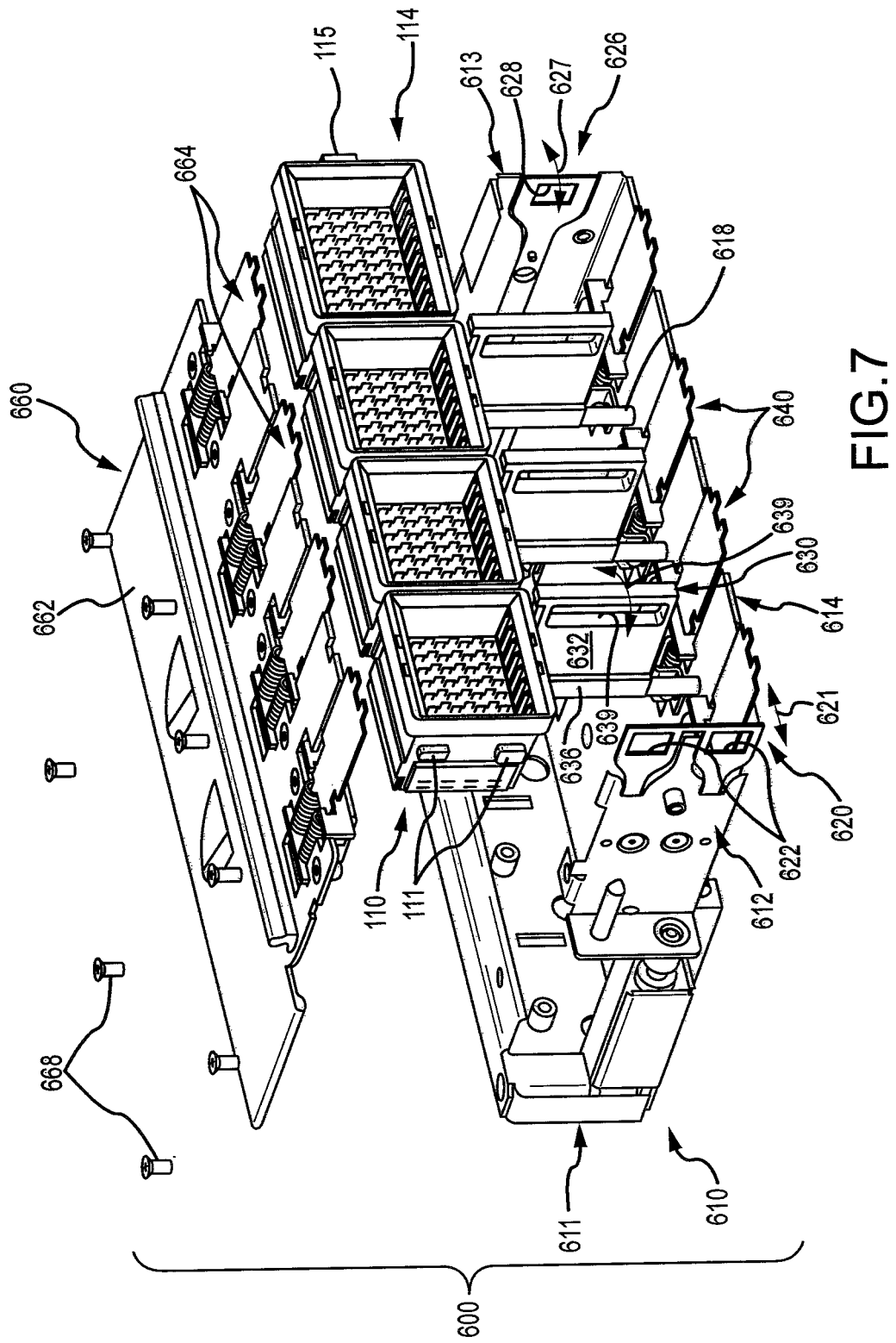
FIG. 7 is an exploded view of the assembly of FIG. 6 showing flexible connector engagement members of the right and left sidewalls and rotatable (and removable) middle walls/dividers.

FIG. 7 illustrates the connector retention and alignment assembly 600 in an exploded form to further illustrate its components and how they fit together and interact. FIG. 7 shows that the base assembly 610 also includes a set of pusher/holder assemblies 630 for coupling with a lower edge of the connectors 110, 114 to preload and assure full coupling of the connectors 110, 114 with a later received set of computing device connectors in combination with the upper pusher/holder assemblies 664 in the cover assembly 660.

As shown, the base assembly 610 further includes a left connector engagement member 626 attached to and extending from the left side wall 613 (and opposite the right connector engagement member 620). As with the right member 620, the left connector engagement member 626 is configured to be flexible and resilient (such as by being formed out of a metal or plastic to act as a leaf spring) such that it can be forced outward from the side wall 613 when a leftmost connector 114 is placed upon the base plate 614 with the tab or raised element 115 within a window or opening 628 in the member 626 (which has a width or depth to allow some in and out movement of the connector 114 in the assembly 600 such as during computing device coupling operations).

FIG. 7 shows with arrows 621 and 627 that the ends or heads of the right and left connector engagement members 620 and 626 can be flexed or forced outward and then can spring or flex back toward the interior space (e.g., from a first, non-deformed position to a second, deformed (or flexed outward position) and then back again). This allows the tabs 111 and 115 of the connectors 110 and 114 to be pushed or snapped into place, whereas a rigid side wall would provide no give and would require the connectors to be slid in place from the side and/or the side wall (e.g., side wall 613) to be attached after the connectors. The movement 621, 627 may be a relatively small amount (e.g., a distance matching the height of the tabs 111, 115 or the like) with the resilient members 620, 626 being relative stiff (e.g., with a relative large spring constant) to apply a greater retention or spring force upon the sides of the abutting connectors 110 and 114 while still allowing the connectors 110 and 114 to be pushed into place with the members 620, 626 attached to the side walls 612, 613.

Further, the base assembly 610 includes a set of mounting posts (or self-clinch standoffs) 618 that extend upward from an upper or inner surface of the base or base plate 614. The assembly 600 further includes a set of middle walls or dividers 630 adapted for attaching (in a removable manner) to the posts 618. Each of the middle walls 630 includes a body 632 with a window/opening 634 near a front edge for receiving tabs 111, 115 on sides of the connectors 111 so as to restrain in and out movement within a desired range. The body 632 also includes a rear edge/portion 636 with a channel or passageway passing through such that the wall 630 can be slid over the post 618, and the channel/passageway would have a similar shape as the exterior of the post (and a like dimension with some clearance to allow rotation and not a press fit) such as a circular cross sectional shape when the post 618 takes the form of a cylinder. Not fasteners are utilized (i.e., no adhesive, mechanical, or other fastening technique) is used such that the wall 630 can rotated about the post 618 (e.g., about the longitudinal axis of the post 618) as shown with arrow 639.

By providing the middle walls 630 as removable and rotatable members, a connector 110, 114 can be placed on the base plate 614 with the wall 630 in a first or installation position where it is rotated away from the desired position of the connector 110, 114. Then, once the connector 110, 114 is in place, the wall 630 can be rotated into abutting contact with the connector's exposed side or into a second or retention position with tabs or raised surface on the connector side received in the window or opening 634. The middle walls 630 act both as retaining members and also as dividers or spacers for regaining a desired gap/spacing between. In this manner, the replacement of fixed walls as in the assembly 100 with the walls/dividers 630 facilitates ready assembly of the components even with the sidewalls 612, 613 both in place or affixed prior to initiating the assembly process.

As shown in FIG. 7, the pusher/holder assemblies 664 may be provided in or mounted to the cover or top plate 662 prior to beginning assembly processes (rather than installed by hand later as with assembly 100 of FIG. 1), and, similarly, the pusher/holder assemblies 640 may be attached to the base or base plate 614 prior to the assembly process (e.g., the base assembly 610 may include the lower pusher/holder assemblies 640). The assembly 600 further includes a set or number of fasteners (e.g., screws or the like) 668 for use in fastening or coupling the cover assembly 660 to the base assembly 610 once the connectors 110, 114 and the middle walls 630 are in place.

Figure 8:
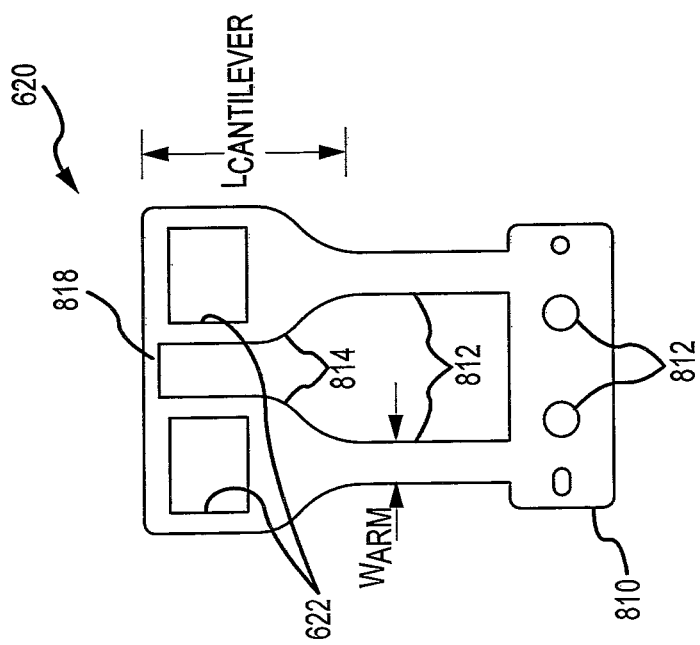
FIG. 8 is a detailed illustration of the connector engagement member of the right side wall.

FIG. 8 illustrates the right connector engagement member 620 in further detail. As shown, the member 620 includes a base portion 810 with openings or passageways 812 for fasteners to pass for use in rigidly affixing the member 620 to the right sidewall 612. From the base portion 810, two arms 812 that are spaced apart and have a width, $W_{Arm}$, that is significantly less than the base 810. The width, $W_{Arm}$, along with the thickness of the member 620 (e.g., 0.1 to 1.0 mm or more) and shape of the arm 812 helps to define the amount of flex and spring force that is provided by the member 620. The member 620 also includes a pair of enlarged heads 814 on the end of the arms 812, with each having a window or opening 622 for receiving tabs/raised elements on the sides of a mating connector. A bridge or linking member 813 may interlink these two heads 814 together to provide a more equal application of spring or retention forces on a connector and/or for structural integrity of the member 620.

When applied to a right side arm 612, a length of the arms and heads as shown at $L_{Cantilever}$ extends outward from the end of the arm 612, and this is the portion of the member 620 that provides the resilient and flexible aspects of the engagement member 620 (e.g., a shorter length, $L_{Cantilever}$, results in a stiffer member 620 and a longer length, $L_{Cantilever}$, provides a more flexible member 620). In one embodiment, the overall length of the member 620 (and member 626) is in the range of 30 and 60 mm, with 45 mm used in some cases, and the cantilevered portion has a length, $L_{Cantilever}$, in the range of about half this length such as in the range of 15 to 30 mm. Generally, the engagement member 620 is adapted to function as a leaf spring that functions to provide a spring or retention force that is adequate to retain the connectors 110, 114 in place during use. Again, the member 620 may be fabricated from a metal such as stainless steel (e.g., Type 301, 302, 304, or the like, half hard or another material such as plastic, and it may be formed as a unitary piece in some embodiments.

Figure 9:
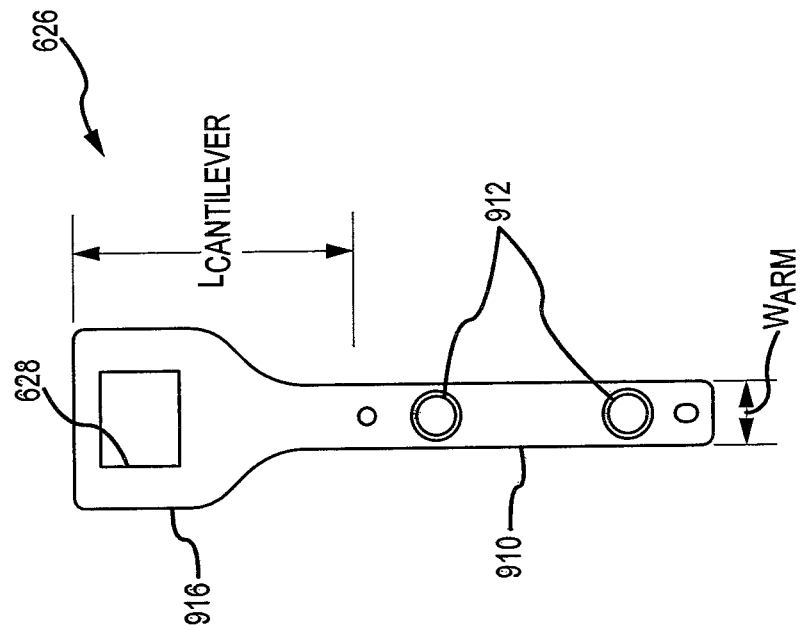
FIG. 9 is a detailed illustration of the connector engagement member of the left side wall.

FIG. 9 illustrates the left connector engagement member 626 in further detail. As shown, the member 626 includes a base or arm portion 910 with openings or passageways 912 for fasteners to pass for use in rigidly affixing the member 626 to the left sidewall 613. The base or arm portion 910 has a width, $W_{Arm}$, that along with the thickness of the member 626 (e.g., 0.1 to 1.0 mm or more) and shape of the base or arm portion 910 helps to define the amount of flex and spring force that is provided by the member 626. The member 626 also includes an enlarged head 916 on the end of the arm 910 that has a window or opening 628 for receiving a tab/raised element on the side of a mating connector. When applied to a left side arm 613, a length of the arms and heads as shown at $L_{Cantilever}$ extends outward from the end of the arm 613, and this is the portion of the member 626 that provides the resilient and flexible aspects of the engagement member 626 (e.g., a shorter length, $L_{Cantilever}$, results in a stiffer member 626 and a longer length, $L_{Cantilever}$, provides a more flexible member 626). Generally, the engagement member 626 is adapted to function as a leaf spring that functions to provide a spring or retention force that is adequate to retain the connectors 110, 114 in place during use. As with member 620, the member 626 may be fabricated from a metal such as stainless steel or another material such as plastic, and it may be formed as a unitary piece in some embodiments.

Figure 10A:
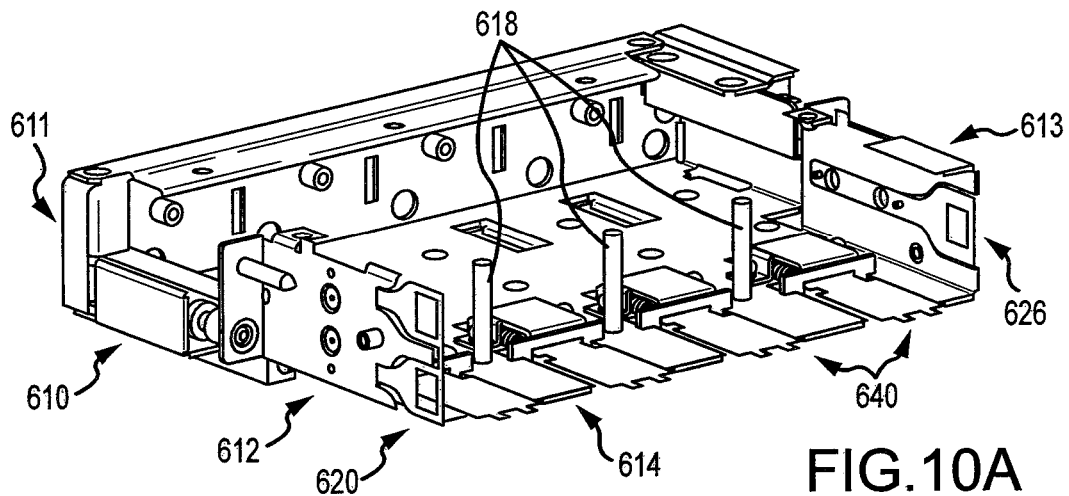
FIGS. 10A-10F illustrates steps of an assembly method for the connector retention and alignment assembly of FIGS. 6 and 7.

FIGS. 10A-10F illustrate the assembly steps or process for the connector retention and alignment assembly 600, which provides improvements in time reduction and ease when compared with the process shown in FIGS. 5A-5G for the prior assembly 100. In FIG. 10A, the first step is shown which is simply providing the base assembly 610, which can be provided "as is" from a manufacturer or some assembly may be performed to provide the base assembly 610, such as to attach the leaf spring-type engagement members 620, 626 on the side walls 612, 613.

Figure 10B:
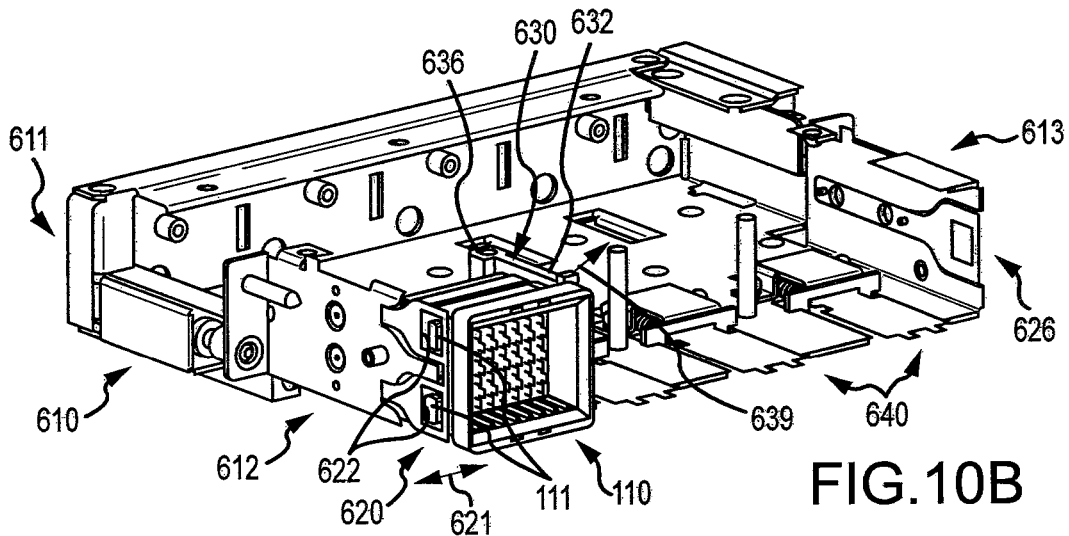

A second step in the process is shown in FIG. 10B that includes positioning the first connector 110 onto the base plate 614 to abut the resilient connector engagement member 620. The tabs 111 of the connector 110 are placed in the windows/openings 622 of the member 620, and the member 620 may flex a distance out as the connector 110 is placed on the base plate 614. The first middle wall 630 is placed in this step, and this involves sliding the wall 630 onto a post 618 in a first connector positioning/placement position and then rotating the middle wall 630 on the post 618 to abut/contact the exposed side of the connector 110 with the window/opening of the middle wall 630 receiving the tab(s) on the side of the connector 110. The resilient member 620 applies a retention or spring force against the proximate side of the connector 110 (which in turn will apply a force against the wall 630 and/or a next inserted connector 110 as shown in FIG. 10C).

Figure 10C:
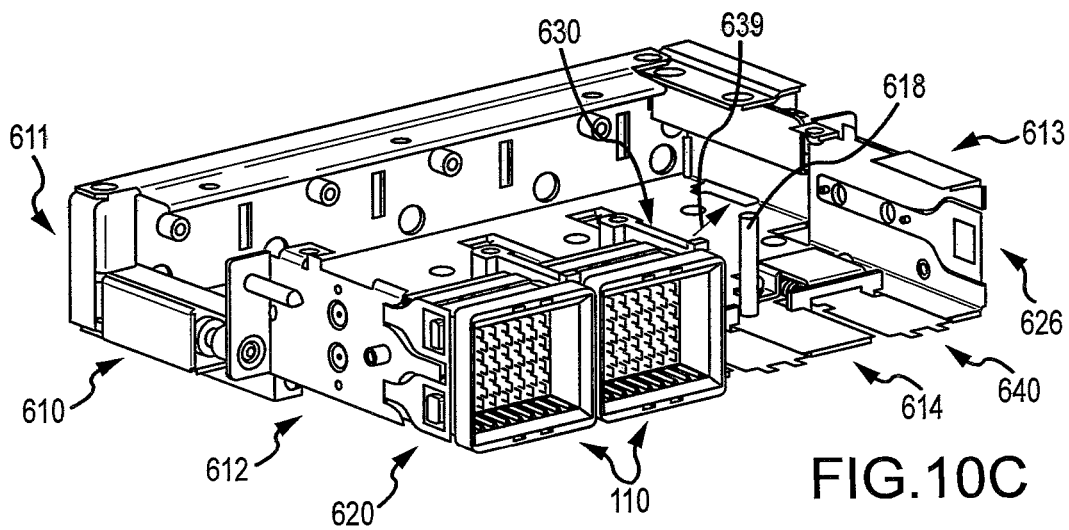

A third step in the process is shown in FIG. 10C that includes placing the second/next connector 110 onto the base plate 614 so as to contact the previously placed and rotated middle wall 630, with the tabs 111 of the connector in the window/opening of the middle walls 630. Also, in this step of FIG. 10C, a second/next middle wall 630 is placed on a second/next mounting post 618 in a connector positioning/placement position and then rotating the middle wall 630 into the second or engagement position as shown to abut or engage the connector 110 (e.g., with the exposed sides contacting the surfaces of the middle wall 630 and a tab within its window/opening).

Figure 10D:
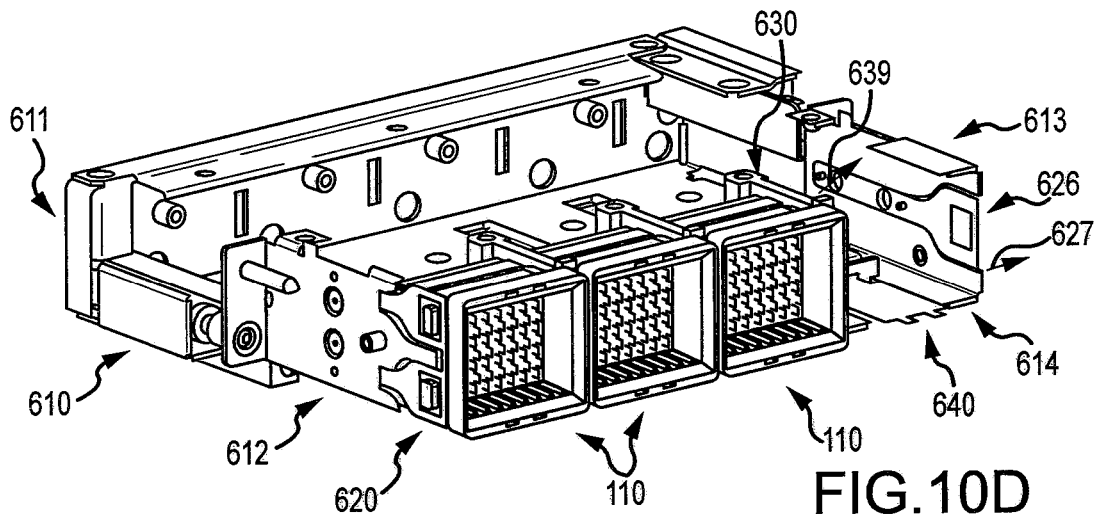

A fourth step in the process is shown in FIG. 10D that includes placing the third/next connector 110 onto the base plate 614 so as to contact the previously placed and rotated middle wall 630, with the tabs 111 of the connector in the window/opening of the middle walls 630. Also, in this step of FIG. 10D, a third/next middle wall 630 is placed on a second/next mounting post 618 in a connector positioning/placement position and then rotating the middle wall 630 into the second or engagement position as shown to abut or engage the connector 110 (e.g., with the exposed sides contacting the surfaces of the middle wall 630 and a tab within its window/opening).

Figure 10E:
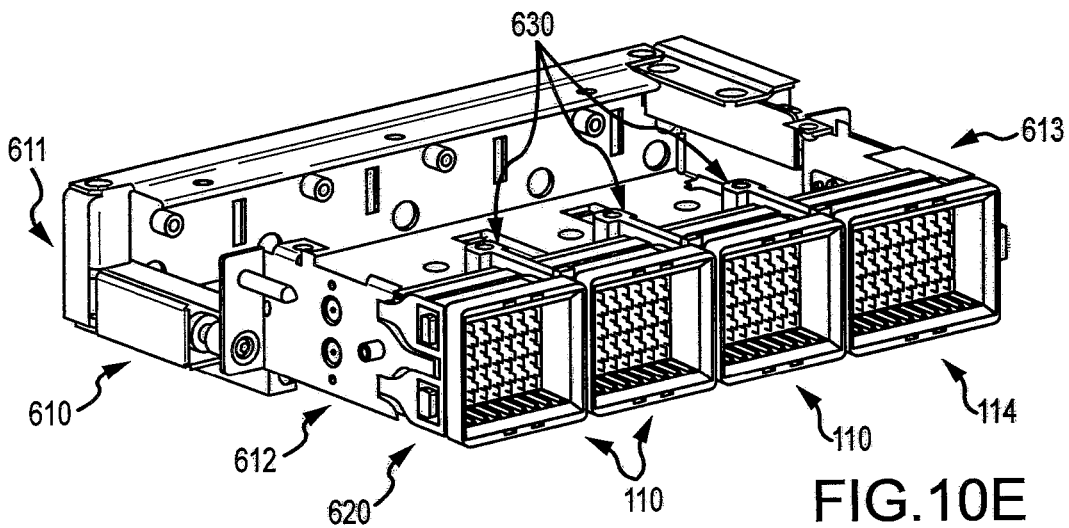

A fifth step in the process is shown in FIG. 10E that includes placing the fourth/next/last (in this exemplary assembly 600 as more or less connectors may be included in the assembly 600) connector 114 onto the base plate 614. Due to the tight clearances between the connectors and the left side wall 613, the connector surfaces such as tab 115 applies forces against the resilient connector engagement member 626 that deforms it (as shown with arrow 627 in FIG. 10D) from an at rest (or non-deformed or engaged) position (shown in FIGS. 10A-10D) to a second or deformed/flexed position as the connector 114 is inserted into the assembly 600. Once the connector 114 is in place with a first side abutting the middle wall 630 and with its tab 115 in the window 627 of the resilient/leaf spring member 626, the resilient member 626 springs back into or toward its non-deformed (at rest or engagement or first) position or state where it applies a spring or retention force against the connector 114 (which, in turn, may apply a retention force against the adjacent one of the connectors 110 and so on).

Figure 10F:
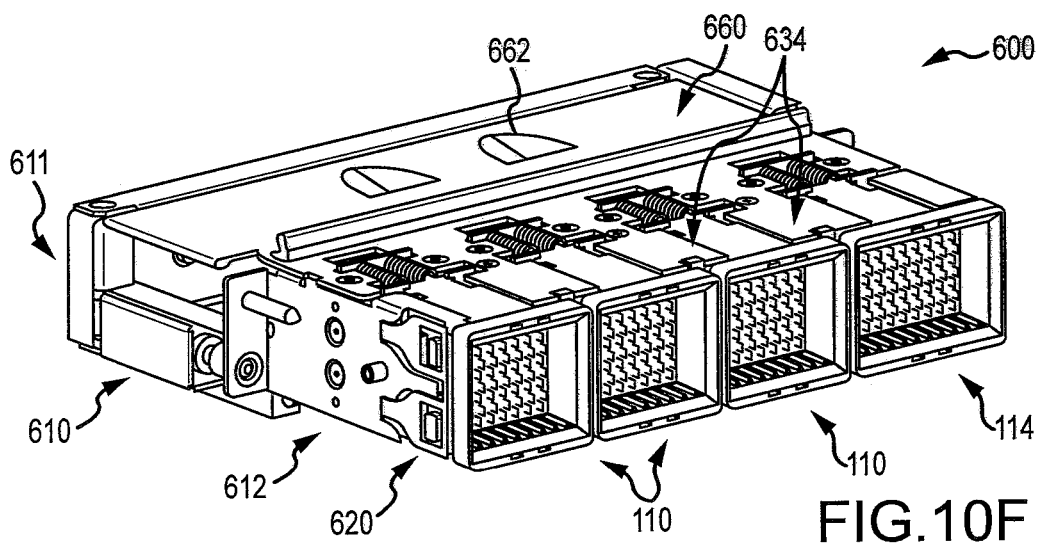

The process is completed in the step shown in FIG. 10F with the placement of the cover assembly 660 over the base assembly 610. In this step, the connectors 110, 114 (which have already been engaged with the push/holder assemblies 640 of the base assembly 610 in the steps shown in FIGS. 10B-10E) are engaged or coupled with the push/holder assemblies 664 of the cover assembly 660 so that these assemblies preload each connector 110, 114 to facilitate full coupling with connectors of a computing device (e.g., an SP tray or the like). Fasteners 668 are used to fasten or attach the cover assembly 660 to the base assembly 610 once this engagement is completed. The assembly 600 may now be affixed to a truss or another rack, enclosure (e.g., a chassis), or support device for computing devices as shown in the examples of FIGS. 11A-12.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A cable connector assembly, comprising:
   a base plate;
   a left side wall extending vertically upward from an upper surface of the base plate;

a right side wall extending vertically upward from the upper surface of the base plate, wherein a space is defined between inner surfaces of the left and right side walls;

a set of two or more connectors positioned side-by-side within the space between the left and right side walls;

a first connector engagement member extending from an end of the left side wall, wherein the first connector engagement member comprises a resilient body that abuts a proximate side of a leftmost one of the connectors to apply a retention force; and a second connector engagement member extending from an end of the right side wall, wherein the second connector engagement member comprises a resilient body that abuts a proximate side of a rightmost one of the connectors to apply a retention force, wherein the resilient body of each of the first and second connector engagement members has a cantilevered portion contacting a corresponding one of the proximate surfaces, and wherein the cantilevered portion has a length in the range of 15 to 30 mm.

2. The cable connector assembly of claim 1, wherein the resilient body of each of the first and second connector engagement members comprises a leaf spring.

3. The cable connector assembly of claim 1, wherein the resilient body of each of the first and second connector engagement members is formed of a stainless steel with a thickness in the range of 0.1 to 1.0 millimeters (mm).

4. The cable connector assembly of claim 1, wherein at least one opening is provided in the cantilevered portion with a width greater than a width of a tab on the proximate surface of the leftmost or rightmost connector by at least 1 mm.

5. The cable connector assembly of claim 1, further comprising a set of spaced-apart mounting posts extending vertically upward from the upper surface of the base plate and a set of middle walls each pivotally coupled with one of the mount posts, wherein each of the middle walls is rotatable from a connector placement position to a connector engagement position to contact a side of one of the connectors.

6. The cable connector assembly of claim 5, wherein the middle walls are removably coupled to the mounting posts and wherein each of the middle walls has a rotation range of at least 15 degrees from the connector placement position to the connector engagement position.

7. The cable connector assembly of claim 5, wherein the middle walls are sandwiched between adjacent pairs of the connectors and retain a gap between each of the adjacent pairs of less than about 0.6 mm.

8. A connector retention and alignment assembly for use in computer device mounting racks or enclosures, comprising:
a base plate;
a left side wall extending vertically upward from an upper surface of the base plate;
a right side wall extending vertically upward from the upper surface of the base plate, wherein a space is defined between inner surfaces of the left and right side walls;
a plurality of connectors positioned side-by-side within the space between the left and right side walls; and
mounting posts extending vertically upward from the upper surface of the base plate; and
a set of middle walls each pivotally coupled with one of the mount posts, wherein each of the middle walls is rotatable from a connector placement position to a connector engagement position to contact a side of one of the connectors.

9. The assembly of claim 8, wherein the middle walls are removably coupled to the mounting posts and wherein each of the middle walls has a rotation range of at least 15 degrees from the connector placement position to the connector engagement position.

10. The assembly of claim 8, wherein the middle walls are sandwiched between adjacent pairs of the connectors and retain a gap between each of the adjacent pairs of less than about 0.6 mm.

11. The assembly of claim 8, further including a first connector engagement member extending from an end of the left side wall, wherein the first connector engagement member comprises a resilient body that abuts a proximate side of a leftmost one of the connectors to apply a retention force; and
a second connector engagement member extending from an end of the right side wall, wherein the second connector engagement member comprises a resilient body that abuts a proximate side of a rightmost one of the connectors to apply a retention force.

12. The assembly of claim 11, wherein the resilient body of each of the first and second connector engagement members comprises a leaf spring.

13. The assembly of claim 11, wherein the resilient body of each of the first and second connector engagement members is formed of a stainless steel with a thickness in the range of 0.1 to 1.0 mm.

14. The assembly of claim 11, wherein the resilient body of each of the first and second connector engagement members has a cantilevered portion contacting a corresponding one of the proximate surfaces and wherein the cantilevered portion has a length in the range of 15 to 30 mm.

15. The assembly of claim 14, wherein at least one opening is provided in the cantilevered portion with a width greater than a width of a tab on the proximate surface of the leftmost or rightmost connector by at least 1 mm.

16. The assembly of claim 8, further including a cover, wherein the connectors and the middle walls are sandwiched between the cover and the base plate and wherein the cover and the base plate each further comprise a number of pusher/holder assemblies each engaging one of the connectors and applying a spring force upon the one of the connectors.

17. A connector retention and alignment assembly for use in computer device mounting trusses, racks, or enclosures, comprising:
a base;
a left side wall extending upward from an upper surface of the base;
a right side wall extending upward from the upper surface of the base;
a plurality of connectors positioned side-by-side within a space between the left and right side walls;
a first flexible member extending from an end of the left side wall, wherein the first flexible member is configured as a leaf spring and abuts a proximate side of a leftmost one of the connectors; and
a second flexible member extending from an end of the right side wall, wherein the second flexible member is configured as leaf spring and abuts a proximate side of a rightmost one of the connectors;
posts extending upward from the upper surface of the base plate; and
a set of middle walls each slidingly engaging one of the mount posts, wherein each of the middle walls is rotatable through a rotation range of at least 15 degree prior to positioning of the connectors in the space and wherein each of the middle walls is sandwiched between a pair of adjacent ones of the connectors.

18. The assembly of claim 17, wherein the resilient body of each of the first and second connector engagement members has a cantilevered portion contacting a corresponding one of the proximate surfaces and wherein the cantilevered portion has a length in the range of 15 to 30 mm.

19. The assembly of claim 18, wherein the cantilevered portion comprises an arm with a first width and a head at an end of the arm with a second width greater than the first width and wherein a window is provided in the head for receiving a raised tab on the proximate side of a corresponding one of the connectors.

20. A cable connector assembly, comprising:
a base plate;
a left side wall extending vertically upward from an upper surface of the base plate;
a right side wall extending vertically upward from the upper surface of the base plate, wherein a space is defined between inner surfaces of the left and right side walls;
a set of two or more connectors positioned side-by-side within the space between the left and right side walls;
a first connector engagement member extending from an end of the left side wall, wherein the first connector engagement member comprises a resilient body that abuts a proximate side of a leftmost one of the connectors to apply a retention force;
a second connector engagement member extending from an end of the right side wall, wherein the second connector engagement member comprises a resilient body that abuts a proximate side of a rightmost one of the connectors to apply a retention force;
a set of spaced-apart mounting posts extending vertically upward from the upper surface of the base plate; and
a set of middle walls each pivotally coupled with one of the mount posts, wherein each of the middle walls is rotatable from a connector placement position to a connector engagement position to contact a side of one of the connectors.

21. The cable connector assembly of claim 20, wherein the resilient body of each of the first and second connector engagement members comprises a leaf spring.

22. The cable connector assembly of claim 20, wherein the resilient body of each of the first and second connector engagement members is formed of a stainless steel with a thickness in the range of 0.1 to 1.0 millimeters (mm).

23. The cable connector assembly of claim 20, wherein the resilient body of each of the first and second connector engagement members has a cantilevered portion contacting a corresponding one of the proximate surfaces, wherein the cantilevered portion has a length in the range of 15 to 30 mm, and wherein at least one opening is provided in the cantilevered portion with a width greater than a width of a tab on the proximate surface of the leftmost or rightmost connector by at least 1 mm.

24. The cable connector assembly of claim 20, wherein the middle walls are removably coupled to the mounting posts and wherein each of the middle walls has a rotation range of at least 15 degrees from the connector placement position to the connector engagement position.

25. The cable connector assembly of claim 20, wherein the middle walls are sandwiched between adjacent pairs of the connectors and retain a gap between each of the adjacent pairs of less than about 0.6 mm.

* * * * *